2,999,826
REACTION PRODUCT OF EPOXY RESINS AND POLYAMIDES FROM BLENDS OF ALIPHATIC POLYAMINES AND AROMATIC POLYAMINES
Dwight E. Peerman, Minneapolis, and Don E. Floyd, Robbinsdale, Minn., assignors to General Mills, Inc., a corporation of Delaware
No Drawing. Filed Dec. 24, 1958, Ser. No. 782,655
5 Claims. (Cl. 260—18)

The present invention relates to the reaction products of epoxy resins and certain polyamides derived from polymeric fat acids and a mixture of aliphatic and aromatic polyamines.

Both the aliphatic and aromatic polyamines have been used in the past for curing epoxy resins. It is well known that the aliphatic amines speed up the reaction with epoxy resins, reacting at a faster rate than do the aromatic polyamines. It is also known that the aliphatic polyamines cure epoxy resins at room temperature while the polyamines, which were aromatic in nature, generally must undergo more rigorous curing treatment, requiring higher temperatures and longer periods of cure. The use of aromatic polyamines is also known to impart resistance to distortion at elevated temperatures when reacted with the epoxy resins. In attempting to use mixtures of the aliphatic and aromatic polyamines in order to take advantage of the properties of each, however, several disadvantages appear. If the aliphatic and aromatic polyamines are simply blended together physically and then reacted with epoxy resins, resulting end products are quite brittle and have very poor machining characteristics. In addition, both the aliphatic and aromatic polyamines are quite volatile and quite toxic.

It has now been found that a polyamide, which incorporates aliphatic and aromatic amines, can be reacted with epoxy resins to provide a product, which has great toughness, impact resistance, and machinability. In addition, the volatility of the amines and thereby the toxicity is greatly reduced providing a safety factor. In addition, besides eliminating the disadvantages of the polyamine, it has been found that the desirable features, including high heat distortion temperature, are retained.

It is therefore, an object of the present invention to provide a novel polyamide-epoxy resin reaction product in which the polyamide is derived from polymeric fat acids and a mixture of aliphatic and aromatic polyamines.

It is also an object of this invention to provide a novel polyamide resin-epoxy resin reaction product having high resistance to elevated temperatures.

The epoxy resins (glycidyl polyethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol, novolac resins, various bisphenols and other condensates resulting from the condensation of phenol with aldehydes and ketones such as formaldehyde, acetaldehyde, acetone, methyl ethyl ketone, and the like. A typical epoxy resin prepared from the bisphenols is the reaction product of epichlorohydrin and 2,2-bis(p-hydroxy phenyl) propane (Bisphenol A), the resin having the following theoretical structural formula

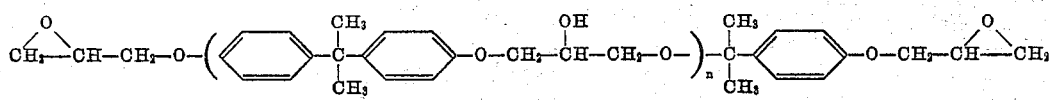

where $n$ is 0 or an integer up to 10. Generally speaking, $n$ will be no greater than 2 or 3 and is preferably 1 or less.

A typical epoxy resin prepared from the novolac resins and epichlorohydrin has the following structural formula

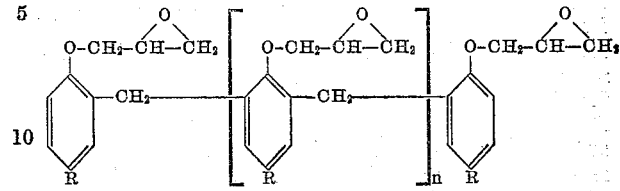

in which R is hydrogen or an alkyl group having from 1 to 4 carbon atoms and $n$ has a range of 1 to 8. The novolac resins are well known polyhydric phenols having the following structural formula

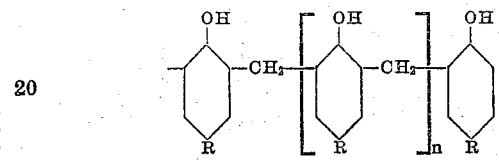

in which R and $n$ are defined as above.

Epoxy resins may be characterized further by reference to their epoxy equivalent weight, the epoxy equivalent weight of pure epoxy resins being the mean molecular weight of the resin divided by the mean number of epoxy radicals per molecule or in any case the number of grams of epoxy resin equivalent to one mol of the epoxy group or one gram equivalent of epoxide. Epoxy resinous compositions encompassed by this invention are those having an epoxide equivalent weight of 160 to 325, the preferred epoxy equivalent weight being 175 to 240, expressed in terms of grams of compounds per epoxy group.

The amino-polyamides which may be used with the epoxy resins are those derived from the polymeric fat acids and a mixture of aliphatic and aromatic polyamines. Illustrative of such aliphatic polyamines are ethylene diamine, diethylene triamine, triethylene tetramine, tetraethylene pentamine, hexamethylene diamine, and 1,3-iminobispropyl amine and the like. The aromatic constituent may be metaphenylene diamine, paraphenylene diamine, p,p'-methylene dianiline, orthotolidine, 2,4-tolylene diamine, and the like. In addition, the polyamides are those having a high amine number. By amine number is meant the number of milligrams of potassium hydroxide equivalent to the amine groups in one gram of product. Generally, amine numbers in the range of 50 to 450 are preferred.

While the mixture of polyamine utilized may constitute one aliphatic amine and one aromatic amine which provides some improvement in the properties of the final product, it has been found and it is preferred that the mixture constitutes two different aliphatic polyamines and one aromatic amine. It is believed that the incorporation of more than one aliphatic polyamine has the effect of increasing the rate of cure with reacted resins while decreasing the viscosity of the polyamide. This is believed to be due to the chain lengths being interrupted at irregular intervals, thus greatly reducing hydrogen bonding between molecules of the polyamide. This heterogeneous chain length results in a lower viscosity in the resulting polyamide which in turn makes it easier to handle and to mix without the use of solvents or viscosity reducers.

The polymeric fat acids employed in preparing the polyamide resins are those resulting from the polymerization of drying or semi-drying oils or the free acids or the simple aliphatic alcohol esters of these acids, for example, sources rich in linoleic acids. Suitable drying or semi-drying oils include soybean, linseed, tung, perilla, cotton seed, corn, sunflower, safflower and dehydrated castor oil. Suitable fatty acids may also be obtained from tall oil, soap stock and other similar materials. In the polymerization process for the preparation of a polymeric fat acid, the fatty acids with sufficient double bond functionality combine for the most part, possibly by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. The term "polymeric fat acid" as used herein is intended to include the polymerized mixture of acids which usually contain a predominant portion of dimer acids, a small quantity of trimer and higher polymeric fat acids and some residual monomer.

It should be appreciated that the polymeric fat acids will as a practical matter result from fatty acid mixtures which contain a preponderance of linoleic acids since the only naturally occurring poly unsaturated acid available in large quantities is linoleic acid. It should also be appreciated that since linoleic acid occurs in nature as a complex mixture in every instance, it is available in various degrees of purity ranging from relatively expensive pure linoleic acid that has been laboriously purified, to crude sources such as tall oil and soap stock which contains substances other than fatty acids. One method of obtaining the linoleic rich fatty acids is by separating a major portion of the oleic and saturated fatty acids from any convenient and economical source of fatty acids having a high iodine value. In addition, polymeric fat acids are readily available commercial products. One such product is "Empol 1022" sold by Emery Industries, Inc.

The following examples will serve to illustrate the present invention.

EXAMPLE I

A polyamide was prepared using 425 grams (1.50 eq.) of polymerized unsaturated vegetable oil acids, principally linoleic acid, 161 grams (3.97 eq.) of triethylene tetramine, 57 grams (1.47 eq.) of tetraethylene pentamine and 50 grams (0.03 eq.) of metaphenylene diamine. The materials were charged at one time into a reaction vessel and agitated at 200° C. for four hours, the last two hours of which were at 25 inches Hg vacuum. The resulting polyamide had a viscosity on a Brookfield viscometer of 240 poises, an amine number of 280 and a color on the Gardner Scale of 12.

EXAMPLE II

A polyamide was prepared by condensing 440 grams (1.50 eq.) of polymerized unsaturated vegetable oil acids, principally linoleic acid, with 127 grams (3.60 eq.) of diethylene triamine, 73 grams (1.80 eq.) of triethylene tetramine and 79 grams (0.80 eq.) of p,p-methylene dianiline. The materials were reacted as in Example I. The Brookfield viscosity of this polyamine was 90 poises. The amine number was 270 and the color 10.

EXAMPLE III

A polyamide was prepared using 0.5 mol of commercially available polymeric fat acids (Empol 1022) 0.625 mol (2.5 eq.) of triethylene tetramine, 0.375 mol (1.875 eq.) of tetraethylene pentamine, and 0.2 mol (0.4 eq.) of metaphenylene diamine. All of the ingredients were reacted at one time with the exception of the tetraethylene pentamine. The first ingredients were heated at 200° C. for three hours, the last hour being under a 25 inch vacuum. The tetraethylene pentamine was then added and the temperature held at 200° C. for one hour and then for an additional hour at 230° C. The resulting polyamide had a viscosity of 230 poises and an amine number of 408.3.

EXAMPLE IV

A polyamide was prepared in the same manner as in Example III except that in this case the tetraethylene pentamine was the ingredient that was added at a later time. In this case the Brookfield viscosity was 225 poises and the amine number was 409.

EXAMPLE V

A polyamide was prepared using 0.5 mol (1.0 eq.) of commercially available polymeric fat acids (Empol 1022), 0.6750 (2.5 eq.) of triethylene tetramine, 0.375 mol (1.87 eq.) of tetraethylene pentamine, and 0.2 mol (0.4 eq.) of metaphenylene diamine. The materials were charged at one time to a reaction vessel and heated at 200° C. for three hours, the last hour being under a 25 inch vacuum. The temperature was then raised to 230° C. for an additional hour. The resulting polyamide had a viscosity of 425 poises and an amine number of 386.1.

EXAMPLE VI

A polyamide was prepared as in Example V using 0.5 mol (1.0 eq.) of commercially available polymeric fat acids (Empol 1022), .75 mol (3.75 eq.) of tetraethylene pentamine, 0.5 mol (1.5 eq.) diethylene triamine, and 0.2 mol (0.4 eq.) of methylene dianiline. The resulting polyamide had a viscosity of 680 poises and an amine number of 333.1.

EXAMPLE VII

A polyamide was prepared using 0.5 mol (1.0 eq.) of commercially available polymeric fat acids (Empol 1022), 0.75 mol (3.75 eq.) of tetraethylene pentamine, 0.5 mol (1.5 eq.) of diethylene triamine, and 0.2 mol (0.4 eq.) of methylene dianiline. All the ingredients were added with the exception of the diethylene triamine and heated at 200° C. for 2 hours. The diethylene triamine was then added and the temperature maintained at 200° C. for one hour and at 230° C. for an additional hour. No vacuum was used in this case. The resulting polyamide had a Brookfield viscosity of 350 poises and an amine number of 368.

EXAMPLE VIII

The polyamide of Example I was blended at room temperature with an epoxy resin derived from epichlorohydrin and Bisphenol A with an epoxide equivalent value of 190–210 (Epon 828) in the ratio of one part of polyamide to four of epoxy. After curing at 150° C. for one hour, the cured composition had a Barcol hardness of 73 to 77. It had a heat distortion temperature of 106° C. The tensile strength of the cured material was 8,000 p.s.i. with a modulus of $3.75 \times 10^4$ and an elongation of 7.35%. The flexural strength of the cured product was 11,850 p.s.i. with a modulus of $3.7 \times 10^5$. The cured composition had a compressive strength of 15,000 p.s.i. The resinous composition was used to impregnate fiber glass cloth to obtain a laminate. Six plys of 181 fiber glass cloth with 114 finish were placed in a matched metal die and impregnated with a blend of 4 parts of Epon 828 and one part of the polyamide of Example I. The die was closed and the laminate cured for twenty minutes at 300° F. The resulting laminate had a resin ratio of 65/35. It was 0.061 inch thick and had a flexural strength of 40,000 p.s.i. with a modulus of $3 \times 10^6$. After two hours in boiling water the flexural strength was 27,500 p.s.i. The laminate was subject to 10,000 p.s.i. flexural loading in water at 150° F. In this test the laminate which stood the above stress for two days after which time the test was terminated since the laminate had not failed.

EXAMPLE IX

The polyamide of Example II was combined with an epoxy resin derived from epichlorohydrin and Bisphenol A having an epoxide equivalent of 190–210 (Epon 828) in the ratio of three parts of polyamide to seven parts of epoxy. After curing at 150° C. for three hours, the composition had a Barcol hardness of 65 to 70. Its heat distortion temperature was 109° C. The tensile strength was 7,900 p.s.i. with a modulus of $3.1 \times 10^4$. The elongation was 5.94%. Its flexural strength was 8,400 p.s.i. with a modulus of $3.92 \times 10^5$. The compressive strength of the resin was 13,500 p.s.i.

EXAMPLE X

The polyamide of Example II was blended with an epoxy resin of Examples VIII and IX derived from epichlorohydrin and Bisphenol A at a ratio of three parts polyamide to seven parts epoxy and used to prepare a fiber glass laminate. The laminate was prepared in the same manner as that in Example VIII. This laminate had a flexural strength of 60,150 p.s.i., a tensile strength of 31,900 and a flexural strength after two hours in boiling water of 50,680 p.s.i. The laminate did not fail after two days exposure in the hot water flexural test as described.

The polyamides of Examples III through VII were then reacted in various proportions with an epoxy resin derived from Bisphenol A and epichlorohydrin having an epoxide equivalent of 190–210 (Bakelite ERL-2774). The following table illustrates the results of such reactions.

Table I

| Polyamide Example | Ratio of Polyamide to Epoxy | Barcol Hardness | HDT,[1] ° C. | Flexural Strength, p.s.i. |
|---|---|---|---|---|
| 3 | 40/60 | 66 | 85 | 13,430 |
|   | 35/65 | 68 | 94 | 11,030 |
|   | 30/70 | 70 | 97 | 8,700 |
|   | 25/75 | 69 | 88 | 11,000 |
| 4 | 40/60 | 64 | 80 | 8,800 |
|   | 35/65 | 72 | 93 | 9,000 |
|   | 30/70 | 67 | 97 | 8,000 |
|   | 25/75 | 67 | 91 | 7,390 |
| 5 | 40/60 | 67 | 85 | 4,168 |
|   | 35/65 | 69 | 100 | 9,450 |
|   | 30/70 | 69 | 102 | 10,980 |
|   | 25/75 | 68 | 91 | 7,200 |
| 6 | 40/60 | 67 | 95 | 8,150 |
|   | 35/65 | 69 | 105 | 10,200 |
|   | 30/70 | 70 | 107 | 7,250 |
|   | 25/75 | 69 | 98 | 7,900 |
| 7 | 40/60 | 60 | 72 | 5,500 |
|   | 35/65 | 64 | 77 | 10,900 |
|   | 30/70 | 65 | 81 | 12,700 |
|   | 25/75 | 63 | 79 | 4,700 |

[1] HDT is heat distortion temperature as determined by ASTM D648-41T.

From the foregoing descriptions and examples, it can be seen that lower viscosity products and higher amine value are obtained when one of the amines is added after the initial reaction is completed. However, better heat distortion temperatures are produced by products made in which the polyamide used was prepared with all of the ingredients in the initial reaction.

Having thus described our invention we claim:

1. A cured composition of matter comprising an epoxy resin being a polyglycidyl ether of a polyhydric phenol and an amino polyamide of polymeric fat acids and a mixture of an arylene polyamine and two different alkylene polyamines.

2. A cured composition of matter as defined in claim 1 in which said epoxy resin is employed in an amount of from 60 to 75 percent and said amino polyamide is employed in an amount of from 40 to 25 percent by weight based on the total amount of epoxy resin and amino polyamide.

3. A cured composition of matter as defined in claim 1 in which said arylene polyamine is phenylene diamine.

4. A cured composition of matter as defined in claim 1 in which said polyamide has an amine number of from 50 to 450.

5. A cured composition of matter comprising from 60 to 75% by weight of an epoxy resin being a polyglycidyl ether of polyhydric phenol having an epoxy equivalent weight of 160 to 325 and from 40 to 25% by weight of an amino polyamide of polymeric fat acids and a mixture of an arylene polyamine and two different alkylene polyamines, said polyamide having an amine number of from 50 to 450.

References Cited in the file of this patent

UNITED STATES PATENTS

| 2,379,413 | Bradley | July 3, 1945 |
| 2,705,223 | Renfrew et al. | Mar. 29, 1955 |
| 2,930,773 | Renfrew et al. | Mar. 29, 1960 |

OTHER REFERENCES

Floyd et al.: J. Appl. Chem., 7, May 1957, pp. 250–260.

Lee et al.: "Epoxy Resins," pp. 109–110, McGraw-Hill Book Co., Inc., New York, July 1957.